US012726919B2

(12) United States Patent
Wadsworth et al.

(10) Patent No.: US 12,726,919 B2
(45) Date of Patent: Sep. 1, 2026

(54) WIRELESS SIGNALING METHODS AND DEVICES FOR NOTIFYING DUTY CYCLE TRANSMISSION EXHAUSTION

(71) Applicant: Morse Micro Pty. Ltd., Surry Hills (AU)

(72) Inventors: Simon Wadsworth, Surry Hills (AU); Andrew Pope, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 362 days.

(21) Appl. No.: 18/627,957

(22) Filed: Apr. 5, 2024

(65) Prior Publication Data

US 2024/0389035 A1 Nov. 21, 2024

(30) Foreign Application Priority Data

May 17, 2023 (AU) ................................ 2023901522

(51) Int. Cl.
*H04W 52/54* (2009.01)
*H04W 52/34* (2009.01)

(52) U.S. Cl.
CPC ........... *H04W 52/54* (2013.01); *H04W 52/34* (2013.01)

(58) Field of Classification Search
CPC .............................. H04W 52/54; H04W 52/34
See application file for complete search history.

(56) References Cited

U.S. PATENT DOCUMENTS

| | | | | |
|---|---|---|---|---|
| 8,009,658 | B2 * | 8/2011 | Welborn | H04B 1/7176 370/347 |
| 2003/0086393 | A1 * | 5/2003 | Vasudevan | H04L 1/0006 370/345 |
| 2014/0334387 | A1 * | 11/2014 | Doppler | H04W 74/0816 370/329 |
| 2014/0335871 | A1 * | 11/2014 | Doppler | H04W 16/02 455/448 |
| 2017/0064727 | A1 * | 3/2017 | Chrisikos | H04W 72/1215 |
| 2018/0124705 | A1 * | 5/2018 | Su | H04W 52/0277 |
| 2018/0288789 | A1 * | 10/2018 | Wang | H04L 47/6225 |
| 2021/0144652 | A1 * | 5/2021 | Gheorghiu | H04W 52/365 |
| 2021/0227471 | A1 * | 7/2021 | Chitrakar | H04W 52/0235 |
| 2021/0360677 | A1 * | 11/2021 | Liberg | H04W 72/23 |
| 2022/0200749 | A1 * | 6/2022 | Hald | H04B 17/309 |
| 2022/0210743 | A1 * | 6/2022 | Yi | H04W 52/146 |
| 2023/0239868 | A1 * | 7/2023 | Kuo | H04W 72/0446 370/329 |

* cited by examiner

*Primary Examiner* — David Bilodeau
(74) *Attorney, Agent, or Firm* — Polsinelli PC

(57) ABSTRACT

Methods and wireless communication devices for notifying a peer device about duty cycle transmission budget exhaustion. An embodiment transmits a first data frame carrying a power management bit to a peer device when a transmission budget is about to be exhausted, updates the transmission budget over time, and transmits a second data frame carrying a power management bit to the peer device to resume communication according to the updated transmission budget. Another embodiment inserts a Restricted access window Parameter Set (RPS) Information Element (IE) into a beacon frame to reserve a time slice when a transmission budget is about to be exhausted and transmits the beacon frame on a wireless channel to notify peer devices transmission on the wireless channel in the time slice is prohibited.

20 Claims, 12 Drawing Sheets

WIRELESS SIGNALING METHODS AND DEVICES FOR NOTIFYING DUTY CYCLE TRANSMISSION EXHAUSTION

The present application claims priority from Australian provisional patent application number 2023901522 filed on 17 May 2023, the contents of which are incorporated herein by cross-reference.

FIELD OF THE INVENTION

The present disclosure generally relates to wireless communications. Specifically, aspects of the present disclosure are related to wireless communication devices conforming to a duty cycle constraint.

BACKGROUND

A wireless communication system, for example, a Wireless Local Area Network (WLAN), typically includes multiple wireless communication devices including at least an Access Point (AP) communicating with one or more Stations (STAs). The AP of the wireless communication system may be coupled to another network, such as the Internet, and may enable STAs to communicate bi-directionally or enable a STA to communicate with other devices in the network through the AP. An available frequency bands may be shared with an enormous number of wireless communication devices in the WLAN, in certain regulatory domains, there is a regulatory constraint for some frequency bands on the airtime used by a transmitting device using the medium for both AP and STA in a Basic Service Set (BSS), which is referring to as the duty cycle constraint. Wireless communication devices operating in regulatory domains such as Europe and Japan need to restrict the transmission airtime such that the transmission ratio is below a predetermined duty cycle over any given observation window. An observation window having a length equal to an observation period is used to measure an accumulated transmission time, however, since the start of the observation window is undefined, the percentage of airtime used by each AP or STA to send packets must be less than the duty cycle constraint within the observation window starting from any time. The observation period is relatively long compared to the packet transmission time, for example, the observation period in some regulatory domains is set to one hour. How operators within these restricted channels achieve this duty cycle requirement is vendor specific.

A wireless communication device conforming to the duty cycle constraint is configured to wait for a certain period of time after each successful transmission. For example, for a 10% duty cycle limit, a wireless communication device that has recently used a wireless channel for 1 millisecond (ms) must wait for another 9 ms for this wireless channel to be available to it again. The purpose of deploying the duty cycle constraint ensures fair access to the wireless medium for all connected devices competing for the frequency bands. The duty cycle constraint needs to be considered in designing real-time Internet of Things (IoT) systems where a large number of connected devices have to send data wirelessly over a long distance in real-time.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more embodiments relating to the signaling methods disclosed herein in a simplified form to precede the detailed description presented below.

Disclosed are signaling methods for notifying one or more peer devices wirelessly connected to a wireless communication network about transmission budget exhaustion. Embodiments of a signaling method comprise determining whether a transmission budget is about to be exhausted, transmitting a first data frame carrying a power management bit to a peer device then marking the transmission budget as being exhausted if the transmission budget is about to be exhausted, updating the transmission budget over time and transmitting a second data frame carrying a power management bit to the peer device to resume communication with the peer device according to the updated transmission budget. The transmission budget is derived based on a duty cycle constraint and an accumulated transmission time within an observation window. An embodiment of the peer device is an Access Point (AP) of a Wireless Local Area Network (WLAN).

In some embodiments, the first data frame carrying a power management bit is used to notify the peer device about entering a power management mode, and the second data frame carrying a power management bit is used to notify the peer device about leaving the power management mode. For example, the first data frame carrying a power management bit is a Quality of Service (QOS) Null [asleep] frame and the second data frame carrying a power management bit is a QoS Null [awake] frame. In some embodiments, the signaling method further comprises entering a power management mode when the transmission budget is marked as being exhausted.

In some embodiments, the transmission budget is about to be exhausted when the transmission budget is below a predefined or an adaptive threshold. The threshold is set according to airtime for transmission of one or more frames. For example, the threshold is set to be longer than the airtime required for transmitting the first data frame carrying a power management bit.

The signaling method further comprises determining whether there is data traffic buffered in the peer device according to an embodiment of the present invention. The second data frame carrying a power management bit is only transmitted to the peer device when there is data traffic buffered in the peer device. The signaling method further comprises receiving one or more beacon frames from the peer device and determining whether there is data traffic buffered in the peer device according to the one or more beacon frames.

In one embodiment, a proprietary signaling method comprises calculating a point of time at which the transmission budget will be updated to resume the communication with the peer device, inserting information corresponding to the point of time into a third frame, and transmitting the third frame to the peer device. In this embodiment, the third frame may be a vendor-specific action frame or a type of management frame. The point of time may be calculated in terms of Time Synchronization Function (TSF). The transmission budget is reserved for transmission of the first data frame and the third frame by setting a threshold longer than the airtime for transmitting both the first data frame and the third frame, and the transmission budget is about to be exhausted when the transmission budget is below the threshold.

An embodiment of the signaling method further comprises receiving a beacon frame from the peer device, parsing a vendor peer exhaustion Information Element (IE) in the beacon frame, determining a resume time from the vendor peer exhaustion IE, and entering a power management mode until the resume time.

Some other embodiments of a signaling method comprise determining whether a transmission budget is about to be exhausted, inserting a Restricted access window Parameter Set (RPS) Information Element (IE) into a beacon frame to reserve a time slice between a current Target Beacon Transmission Time (TBTT) and a next TBTT if the transmission budget is about to be exhausted, and transmitting the beacon frame on a wireless channel to notify one or more peer devices transmission on the wireless channel between the current TBTT and the next TBTT is prohibited. The transmission budget is derived based on a duty cycle constraint and an accumulated transmission time within an observation window. Embodiments of the peer devices are STAs associated with an AP.

In some embodiments, the signaling method comprises dropping any non-beacon frame in response to the transmission budget is about to be exhausted. Some embodiments of the RPS IE in the beacon frame contain an unused Association ID (AID) that is not assigned to any peer device in the wireless communication network, and the peer devices receiving the beacon frame are prohibited to access the wireless channel between the current TBTT and the next TBTT.

Some embodiments determine whether the transmission budget is about to be exhausted by comparing the transmission budget with a threshold, and the threshold is set to be longer than airtime required for transmitting one or more beacon frames. In some cases, if the transmission budget is still below the threshold at the next TBTT, a RPS IE is inserted into a next beacon frame to reserve another time slice. The next beacon frame is transmitted on the wireless channel to notify the peer devices transmission on the wireless channel is still prohibited according to the RPS IE. In one embodiment of proprietary signaling, a point of time at which the transmission budget will be above the threshold is calculated, and information corresponding to the point of time is inserted into a vendor IE that is appended to the beacon frame.

In one embodiment, a vendor action frame is received from a first peer device notifying peer transmission budget exhaustion, and in response to the vendor action frame, data traffic for the first peer device is buffered and communication with the first peer device is paused. A point of time is derived from the vendor action frame and any buffered data traffic can be sent to the first peer device after the point of time.

An aspect of the present invention discloses a wireless communication device wirelessly connected to a wireless communication network, comprising a receiver, a transmitter, at least a processor, and one or more memory banks. The memory banks are communicatively coupled to the processor and storing processor readable codes that, when executed by the processor in conduction with the receiver and transmitter, is configured to perform an embodiment of the signaling method. For example, the signaling method includes determining whether a transmission budget is about to be exhausted, transmitting a first data frame carrying a power management bit to the peer device and marking the transmission budget as being exhausted when the transmission budget is about to be exhausted, and updating the transmission budget over time and transmitting a second data frame carrying a power management bit to the peer device to resume communication with the peer device according to the updated transmission budget.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. Changes may be made in the function and arrangement of elements without departing from the spirit and scope of the application as set forth in the claims.

Figure 1:
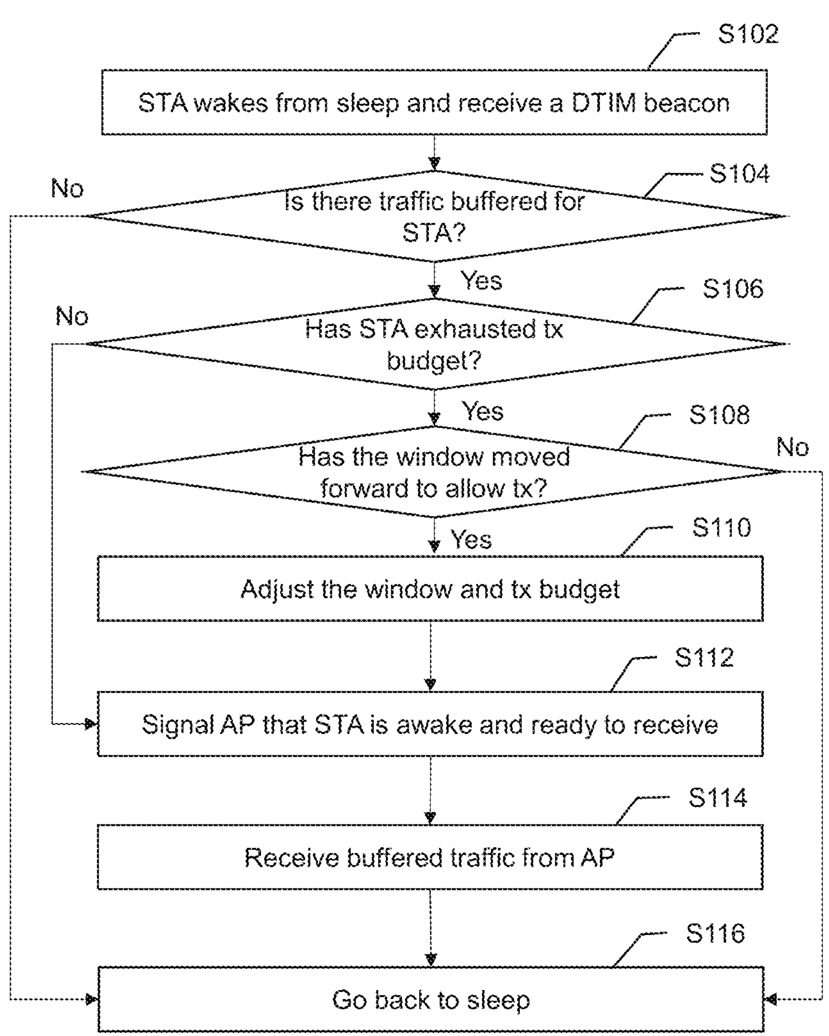
FIG. 1 is a flowchart illustrating the behavior of a STA waking up from a power management mode and adaptively receiving buffered traffic from an AP based on its transmission budget.

Wireless communication devices are configured to operate in a duty cycle mode to comply with the duty cycle constraint of a regulatory domain. The wireless communication device may always operate in one duty cycle mode, or it may be configured to operate in one of multiple duty cycle modes. A duty cycle burst mode is developed along with a conventional duty cycle spreading mode, rather than delaying each successive packet transmission in the duty cycle spreading mode, wireless communication devices operating in the duty cycle burst mode are allowed to send a burst of packets in one hit. This is critical for any video doorbell or battery power camera use cases. For example, a 10% duty cycle restricted device can send at most 6 minutes of burst traffic within a one-hour window before being blocked to transmit. Once the one-hour window has slid forward by a sufficient amount, for example, after the wireless communication device stays quiet for 54 minutes after the 6 minutes burst transmission, this wireless communication device can transmit again. For a wireless communication device operating in the duty cycle burst mode, a transmission budget is recorded and periodically updated according to the time lapsed and according to the airtime used in transmission to reflect the remaining transmission airtime in the observation window. Any transmission will then be blocked when the transmission budget has been exceeded under the duty cycle constraint. FIG. 1 illustrates an exemplary behavior of a STA waking up from a power management mode (e.g. a power saving mode or a sleep mode) and adaptively receiving buffered traffic from an associated AP based on a transmission budget. The STA wakes up from a power management mode to receive a Delivery Traffic Indication Message (DTIM) beacon frame from the AP in step S102 of FIG. 1. The STA first determines if there is data traffic buffered in the AP according to the received DTIM beacon frame in step S104, then the STA checks the transmission budget in step S106 when there is buffered data traffic for the STA. The STA goes back to sleep in step S116 if the received DTIM beacon frame indicates there is no data traffic buffered in the AP. In cases of the transmission budget being exhausted, the STA further determines whether the observation window has moved forward such that there is transmission time available in step S108. The observation window and the transmission budget are adjusted accordingly in step S110 when the STA determines that the observation window has moved forward to allow transmission, otherwise the STA goes back to sleep in step S116 to accumulate more transmission budget. In step S112, since the transmission budget is adjusted to allow transmission, the STA signals the AP notifying it is awake and ready to receive data traffic. The STA receives the buffered data traffic from the AP in step S114 and goes back to sleep in step S116 after the traffic transfer.

The transmission budget of a wireless communication device under the duty cycle spread mode or burst mode can be tracked according to embodiments of the present invention. The transmission budget is exhausted when an accumulated counter tracking a total airtime used within an observation window reaches a maximum transmission time allowed in the observation window. For example, the maximum transmission time is calculated from a total window size multiplying a duty cycle ratio, where the total window size is the period over which the duty cycle requirements will be applied, for example, one hour. Before transmitting a frame, the wireless communication device checks if it has enough transmission budget, and the transmission budget is updated by considering the airtime spent on transmitting the frame. The transmission budget will also be updated when the observation window has moved forward in time.

Figure 2A:
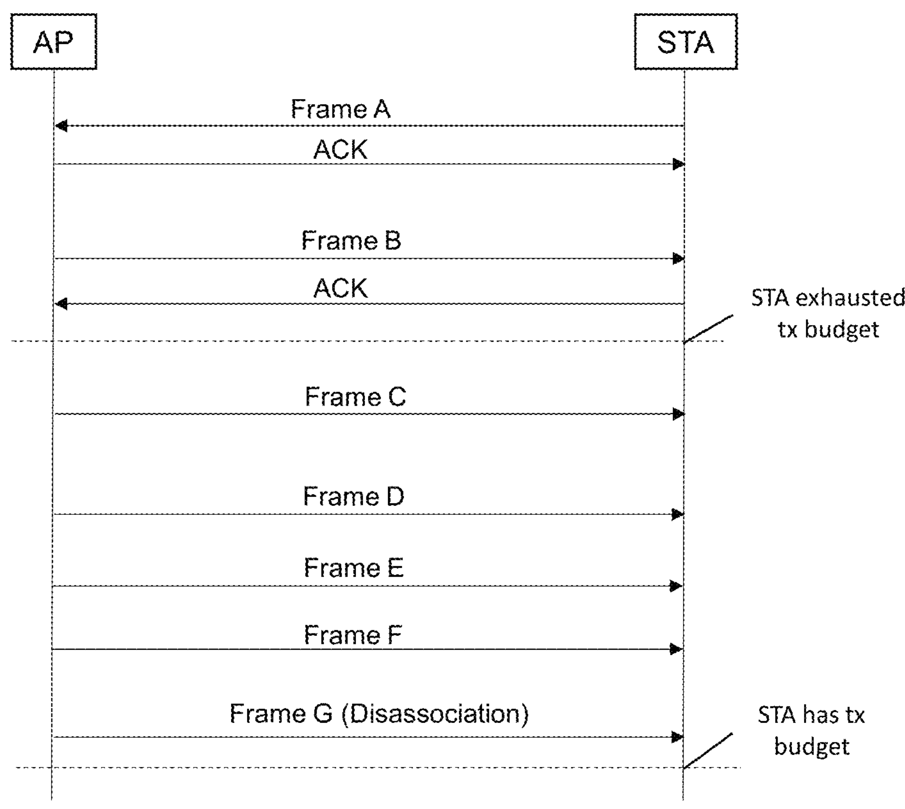
FIG. 2A demonstrates an example of the signaling behavior when a STA exhausts its duty cycle transmission budget.

During the time that the transmission budget of a STA is exhausted, the STA cannot send any frame to the AP, and more importantly, it cannot respond with an Acknowledgement (ACK) frame when receiving a data frame from the AP. The ACK frame is a control frame creating a delivery verification, which is expected after transmission of a data frame to confirm receipt of the data frame. When the STA stops responding to a data frame received from the AP, the AP retransmits the same data frame a few times, resulting in higher airtime consumption. The AP may decide to initiate a disassociation as it does not have the knowledge of whether the STA not responding is due to the STA has left the BSS or the duty cycle transmission budget is exhausted. Once the STA gains more transmission budget after a while, the AP may have already sent disassociation frames. The STA must re-associate to the BSS by exchanging additional frames with the AP. FIG. 2A demonstrates an example of the signaling behavior when the STA exhausts its duty cycle transmission budget. Before the STA runs out of the transmission budget, the STA sends frame A to the AP and receives an ACK frame from the AP, then the STA receives frame B from the AP and responds with an ACK frame. At the time when the STA receives frame C from the AP, it cannot respond with an ACK frame due to the transmission budget being exhausted. Similarly, the AP sends frames D, E, F to the STA and does not get any ACK frame from the STA. The AP may then send frame G to disassociate with the STA by assuming the STA has already left the BSS.

Figure 2B:
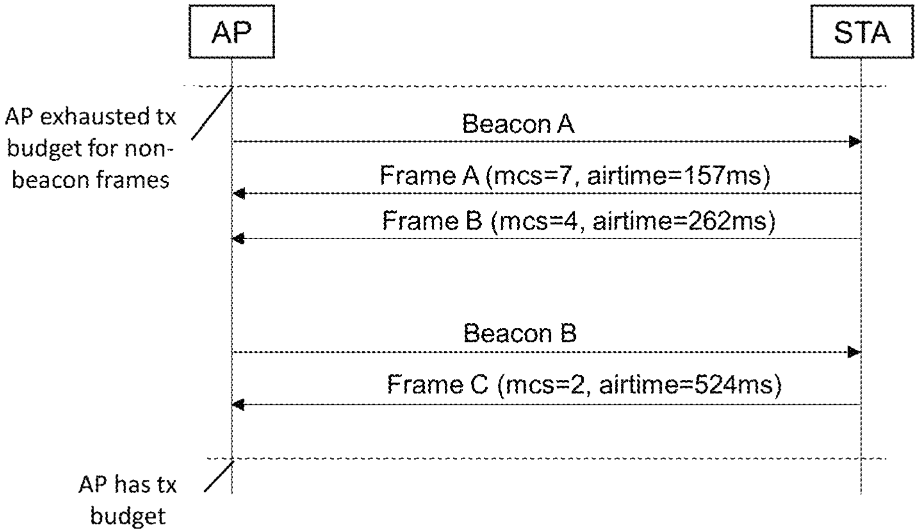
FIG. 2B demonstrates an example of the signaling behavior when an AP exhausts its duty cycle transmission budget.

Similarly, the AP cannot respond with an ACK frame after receiving a frame from an associated STA when the AP is running out of its duty cycle transmission budget. The STA will attempt to retransmit the frame to the AP if not receiving an ACK frame from the AP, and for every failure to deliver a frame, the rate control algorithm of the STA drops the Modulation Coding Scheme (MCS) rate. This increases the duration on air for transmitting each frame, causing the STA to exhaust its transmission budget more rapidly. The STA also wastes additional power for retransmitting the frame to the AP. FIG. 2B demonstrates an example of the signaling behavior when the AP exhausts its duty cycle transmission budget. In a typical design, the AP will reserve the transmission airtime for beacon frames when managing the transmission budget so beacon frames will always be transmitted. The AP in FIG. 2B has exhausted its transmission budget for non-beacon frames, although the AP can send beacon A, it cannot respond to frame A coded with MCS=7 sent from an associated STA. The STA then drops the MCS rate to 4 and retransmits the same content by frame B. The AP still has no transmission budget to respond to frame B, resulting in the STA attempting to retransmit using frame C by dropping the MCS rate to 2. In this example, the STA does not receive any ACK frame from the AP after sending frames A, B, and C and may have also exhausted its transmission budget.

To better manage the power and airtime spent on retransmission due to unannounced duty cycle transmission budget exhaustion on either AP or STA, some new signaling methods are proposed to notify peers in a WLAN BSS that the duty cycle transmission budget is going to be exhausted. These signaling methods apply to APs and STAs operating in a duty cycle mode where the transmission time is governed by a duty cycle constraint. Some embodiments of the signaling methods use standard signaling while some use proprietary signaling to achieve the desired behavior.

Figure 3A:
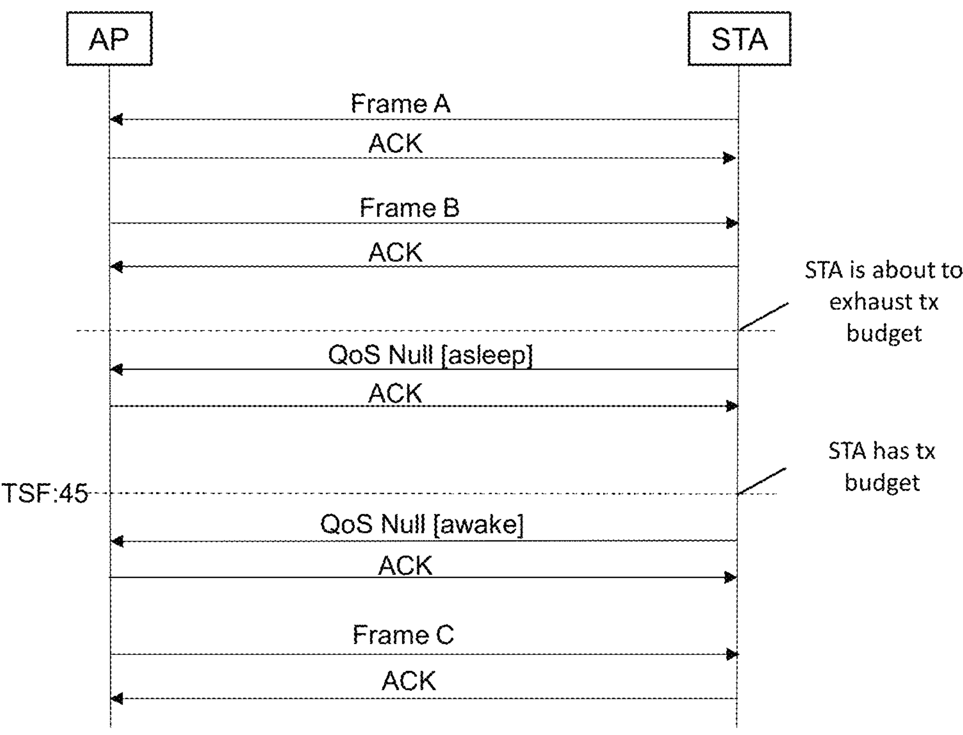
FIG. 3A illustrates an exemplary standard signaling method for a STA to notify an AP that the transmission budget is about to be exhausted according to an embodiment of the present invention.

STA Standard Signaling An embodiment of a STA operating in a duty cycle mode can control the downlink transmission from the AP using a power management bit communicated in data frames. In this embodiment, the airtime for this specific data frame carrying the power management bit is reserved within an observation window over which the duty cycle restrictions are applied, that is, the STA can still send a data frame carrying the power management bit when its transmission budget is about to be exhausted. In the following embodiments, the transmission budget is about to be exhausted may refer to the duty cycle transmission budget falls below a predefined or adaptive threshold, ratio, or percentage. For example, the predefined or adaptive threshold is corresponding to the airtime for transmitting one or more data, management, or control frames using a lowest Modulation Coding Scheme (MCS). The threshold for a STA may be different from the threshold for an AP, and the threshold may be different for various applications and use cases. In some embodiments of the signaling method for notifying an associated AP that a STA is going to run out of its duty cycle transmission budget, the STA notifies the AP through a power management bit communicated in a data frame. Once the STA is going to exhaust its transmission budget, for example, when the transmission budget is below a threshold that normal frames cannot be sent, the STA immediately sends a data frame with a subtype field equal to Quality of Service (QOS) Null to block the AP from sending any downlink frames. The QoS Null data frame is normally used to transmit control information without carrying any data. For example, STAs use QoS Null data frames to indicate to the AP that they are entering a power save mode or that they are waking up. FIG. 3A illustrates an exemplary signaling behavior when a STA is about to exhaust its transmission budget according to an embodiment of the present invention. The STA sends Frame A to the AP and receives an ACK frame from the AP, then the STA receives Frame B from the AP and responds with an ACK frame. At this point of time, the STA is about to exhaust its duty cycle transmission budget, so it sends a QoS Null [asleep] frame to the AP notifying that the STA will not respond for a while. The AP receives this QoS Null [asleep] frame and replies with an ACK frame. The AP then buffers data traffic for the STA instead of sending it immediately to the STA as the STA is treated as it has entered the power management mode. Consequently, the AP will not waste its transmission budget trying to send more frames to the exhausted STA after receiving this QoS Null [asleep] frame. In this example, the STA gains more transmission budget and is able to transmit again at time TSF=45, the STA sends another QoS Null data frame, QoS Null [awake], to the AP after TSF=45 to resume the communication with the AP. The Time Synchronization Function (TSF) is maintained and shared by all AP and STAs in the same BSS. The AP receiving this QoS Null [awake] frame learns that the STA is now ready to receive frames. The AP then replies with an ACK frame for receiving the QoS Null [awake] frame. In this example, the AP sends Frame C to the STA after receiving the QoS Null [awake] frame from the STA. The STA responds with an ACK frame after receiving Frame C. In some embodiments, the STA may enter the power management mode after receiving an ACK frame for the QoS Null [asleep] frame and wake up when it has more transmission budget. After the STA wakes up from the power management mode, the STA may send a QoS Null [awake] frame to the AP. In an embodiment, the STA only transmits a QoS Null [awake] frame when it receives one or more beacons indicating there is buffered traffic for the STA. In this embodiment, the STA does not need to notify the AP about regaining the transmission budget when the AP indicates no traffic for the STA.

Figure 3B:
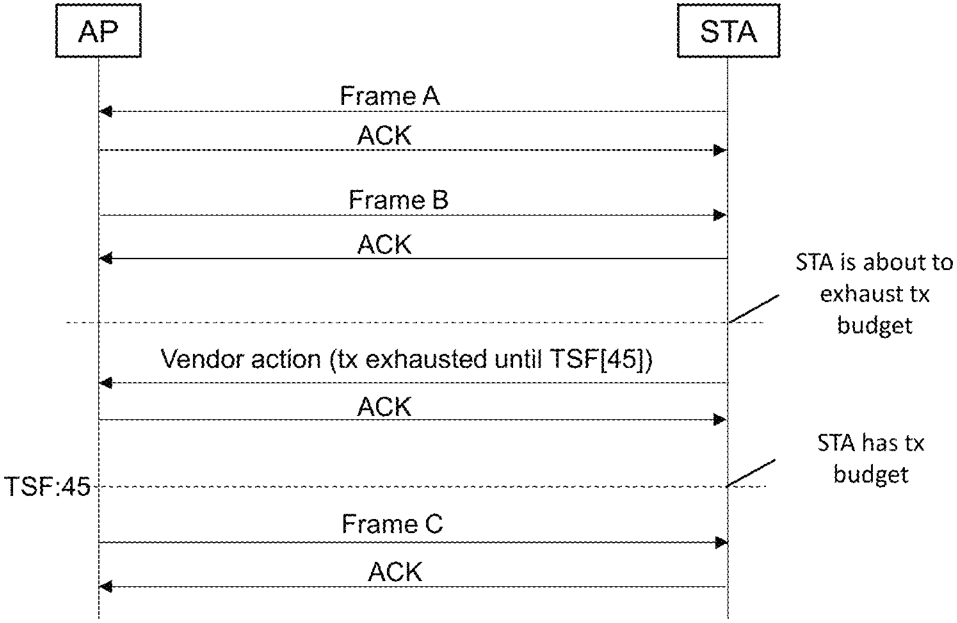
FIG. 3B illustrates an exemplary proprietary signaling method for a STA to notify an AP that the transmission budget is about to be exhausted according to an embodiment of the present invention.

STA Proprietary Signaling In some embodiments of the present invention, a proprietary signaling method is used by an STA to notify the AP that STA's transmission budget is about to be exhausted. Some embodiments of the proprietary signaling method further allow the STA to notify the AP about when the STA will be able to transmit again. For example, a management frame, or more specifically, a vendor-specific action frame is sent to the AP when the STA is about to exhaust its duty cycle transmission budget. The airtime for transmitting this vendor-specific action frame is reserved so the STA can still send this vendor-specific action frame when the transmission budget is about to be exhausted. The vendor-specific action frame may also carry information related to when the STA will have transmission budget again. The AP decodes this vendor-specific action frame to learn about the transmission budget of the STA is exhausted, and the AP may also learn when the STA can start transmitting again based on the shared BSS TSF. The AP can use this knowledge to decide whether to disassociate the STA that has been inactive on the BSS for some time. FIG. 3B illustrates an example of a proprietary signaling method for an STA to notify an associated AP that the transmission budget of the STA is about to be exhausted. In this example, the STA transmits Frame A to the AP and receives an ACK frame from the AP, then the STA receives Frame B from the AP and sends an ACK frame to the AP. When the STA is about to exhaust its transmission budget due to the duty cycle restriction, it sends a vendor action frame specifying that the transmission budget is exhausted until TSF=45. The AP receives this vendor action frame from the STA and responds with an ACK frame. The AP has been notified by the vendor action frame that the STA cannot transmit until TSF=45, so based on this information, it can prevent any disassociation logic before TSF=45. In this example, the AP halts any communication with the STA until TSF=45 according to the vendor action frame and resumes to send frames to the STA after TSF=45. This proprietary signaling method prevents the AP from disassociating an exhausted STA due to lack of knowledge on the peer's duty cycle transmission budget. In an embodiment, the STA can be configured to be more power efficient by entering a power management mode when the transmission budget is exhausted. For example, the STA calculates how long it can enter the power management mode, notifies the AP with a vendor action frame, enters the power management mode after receiving an ACK frame for the vendor action frame, and wakes up according to the calculated time.

Figure 3C:
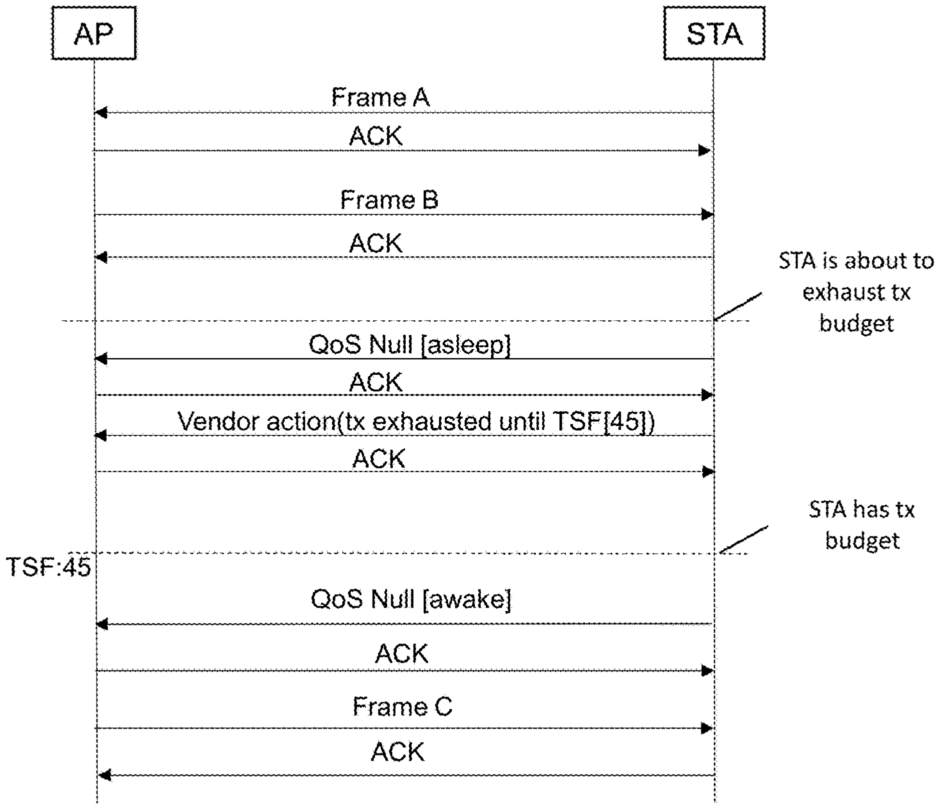
FIG. 3C illustrates an exemplary signaling method for a STA to notify an AP that the transmission budget is about to be exhausted according to another embodiment of the present invention.

STA Standard and Proprietary Signaling In some embodiments of the signaling method for notifying an AP, the STA sends both a data frame carrying a power management bit and a vendor-specific action frame to the AP when the transmission budget is about to be exhausted. In these embodiments, the airtimes for transmitting both the data frame carrying a power management bit and the vendor action frame are reserved in the transmission budget, so these two frames can be transmitted to the AP when the STA transmission budget is about to be exhausted. FIG. 3C illustrates an example of the signaling method according to these embodiments. The STA transmits and receives frames regularly before its transmission budget is about to be exhausted, and immediately after determining the transmission budget is about to be exhausted, the STA transmits a QoS Null [asleep] frame to the AP to block the AP transmitting frames to the STA. The STA further transmits a vendor action frame indicating that the transmission budget is exhausted until TSF=45 to the AP. The AP will buffer data traffic for the STA after TSF=45 or until receiving the QoS Null [awake] frame from the STA. In one embodiment, the STA only sends this QoS Null [awake] frame when receiving a beacon frame from the AP indicating there is data traffic buffered for the STA.

Figure 3D:
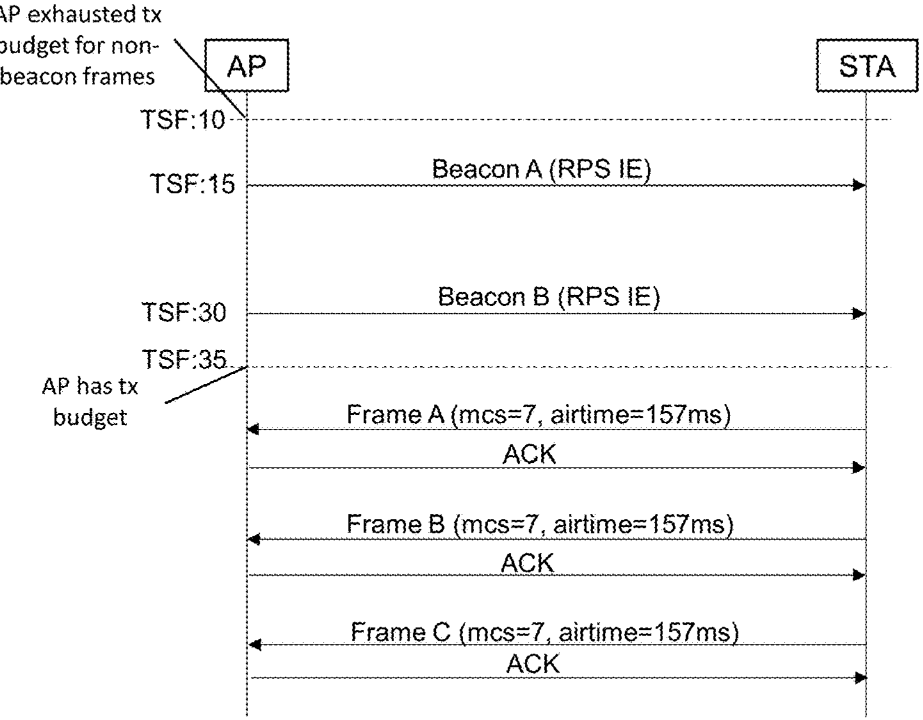
FIG. 3D illustrates an exemplary standard signaling method for an AP to notify one or more STAs that the transmission budget is about to be exhausted according to an embodiment of the present invention.

AP Standard Signaling In various embodiments of the signaling method for notifying associated STAs that an AP is about to exhaust its duty cycle transmission budget, the airtime for beacon transmissions is reserved within the observation window over which the duty cycle restrictions are applied, so that the AP is still able to transmit beacon frames after the transmission budget has been exhausted from a user perspective. Coupling the Restricted Access Window (RAW) Parameter Set (RPS) Information Element (IE) with beacon transmission, the AP reserves an entire time slice between two beacon frames preventing any other stations on the network from transmitting to the AP according to some embodiments of the present invention. This signaling method is not proprietary and should be interoperable with all vendors. FIG. 3D illustrates a standard signaling behavior when an AP has exhausted its transmission budget for non-beacon frames according to an embodiment of the present invention. In this embodiment, the transmission budget of an AP is about to be exhausted refers to the AP has exhausted its transmission budget for non-beacon frames. A shared BSS Time Synchronization Function (TSF) is used as the time scale. The AP sends Beacon A at TSF equals to 15 to reserve the medium between TSF=15 and TSF=30 using a RPS IE in Beacon A. The RAW feature indicated in Beacon A blocks any uplink transmission from all STAs between TSF=15 and TSF=30. STAs receiving Beacon A will not transmit any frame during this period of time, from TSF=15 to TSF=30 according to the RPS IE, to respect the RAW feature. In this example, the AP has a transmission budget after TSF equals to 35, so it sends out Beacon B before TSF equals to 30 to reserve the medium between TSF=30 to TSF=35 using the RPS IE in Beacon B. This RAW feature again prevents all associated stations from transmitting frames during this time period. The STA can send uplink data to the AP after TSF=35 as the AP now has the transmission budget to respond to successfully delivered frames, for example, the STA sends Frame A with a MCS of 7 and gets an ACK frame from the AP, then it sends Frames B and C and receives ACK frames respectively. By implementing the standard signaling method, STAs do not attempt to transmit frames to an exhausted AP, there is no data loss due to the exhausted AP not responding to the frames successfully received. Furthermore, the rate control algorithms in the STA will not collapse. Without this signaling method, the STA transmitting to an exhausted AP may interpret the lack of ACK responding as a poor link and keep reducing the transmission rate, and this STA attempts to retransmit may end up exhausting its own duty cycle transmission budget.

Figure 3E:
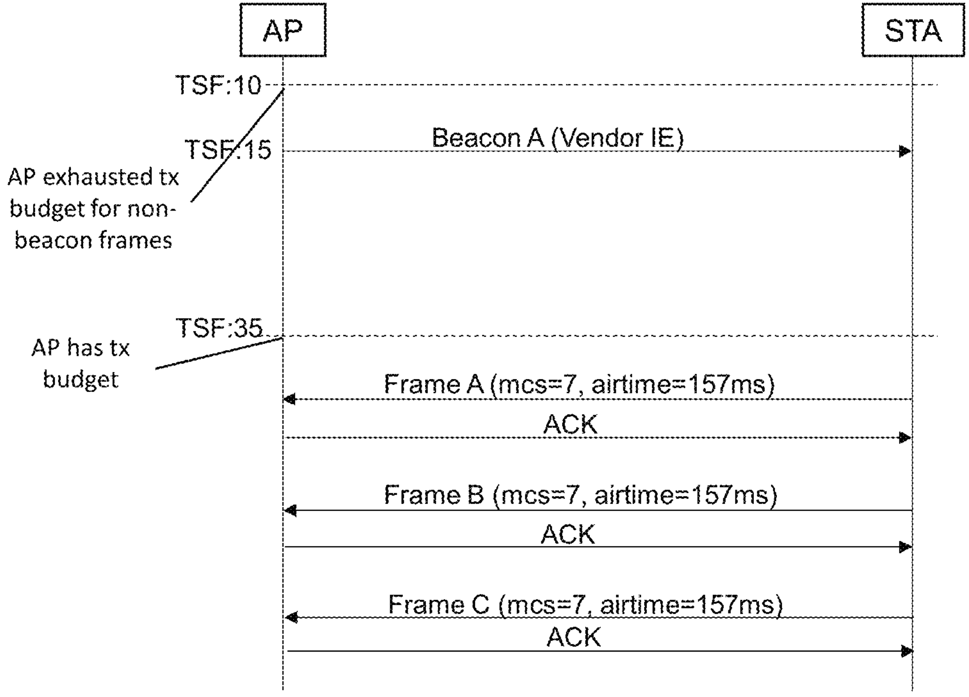
FIG. 3E illustrates an exemplary proprietary signaling method for an AP to notify one or more STAs that the transmission budget is about to be exhausted according to an embodiment of the present invention.

AP Proprietary Signaling In an embodiment of the present invention, the signaling method is proprietary in the form of a vendor IE in the beacon frames. This vendor IE in a beacon frame will signal STAs that the AP cannot transmit non-beacon frames and when the AP will have a transmission budget again, using the shared BSS TSF as the time scale. Devices decode this vendor IE can decide to enter a power management mode until the specified time stamp to be more power conservative. For example, the AP in FIG. 3E signals a vendor IE in Beacon A to notify associated STAs that all STAs cannot transmit again until TSF=35, the STA receives and parses this vendor IE in Beacon A, enters a power management mode, and wakes up at TSF=35. The STA has the knowledge that the AP cannot respond before TSF=35. The proprietary signaling method allows the STAs to enter a power management mode as soon as it learns that the AP does not have any transmission budget to pass traffic to the STAs. The STAs become more efficient in power consumption as it is notified when the AP has more transmission budget so they can sleep until then.

Figure 3F:
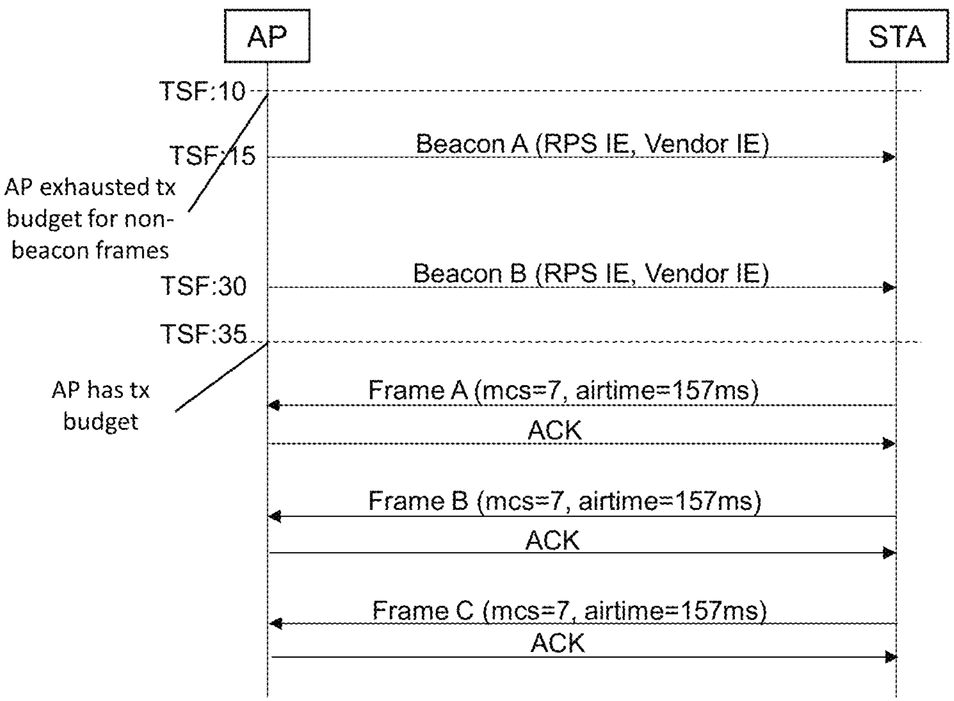
FIG. 3F illustrates an exemplary signaling method for an AP to notify one or more STAs that the transmission budget is about to be exhausted according to another embodiment of the present invention.

AP Standard and Proprietary Signaling In another embodiment of the signaling method for notifying STAs that the AP is exhausted in transmission budget for non-beacon frames, beacon frames contain both RPS IE and vendor IE. FIG. 3F shows an example of the signaling method for notifying a STA by incorporating both RPS IE and vendor IE in beacon frames. In this example, the AP is running out of transmission budget for non-beacon frames from TSF=10 until TSF=35. The AP sends out Beacon A with a RPS IE reserving the medium between TSF=15 and TSF=30, then Beacon B with a RPS IE reserving the medium between TSF=30 and TSF=35. The STAs will not transmit during these RAW periods defined in Beacon A and Beacon B. Beacon A and Beacon B may also contain vendor IE indicating the AP will be able to respond after at TSF=35. Any STA that is capable of decoding the vendor IE can enter a power management mode after receiving and parsing Beacon A. In one example, these STAs entering the power management mode may skip receiving Beacon B and exit the power management mode at TSF=35. Any STA that is incapable of decoding the vendor IE can still get the message of stop transmission between TSF=15 to TSF=30 and between TSF=30 and TSF=35 after receiving and parsing Beacon A and Beacon B.

Figure 4:
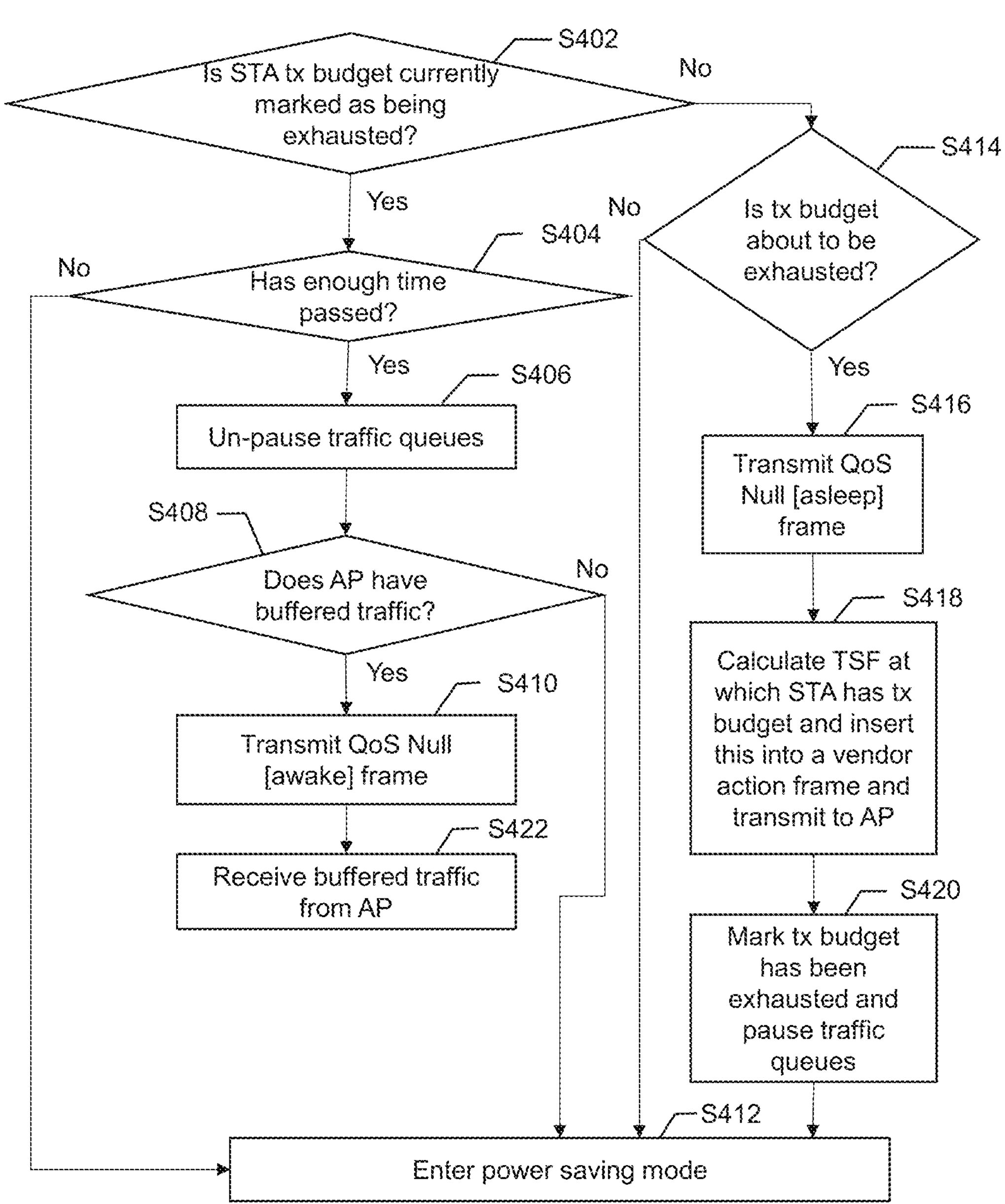
FIG. 4 is a flowchart illustrating a STA notifying an associated AP about transmission budget exhaustion in accordance with an embodiment of the present invention.

FIG. 4 is a flowchart demonstrating an example of a STA notifying an associated AP about transmission budget exhaustion in accordance with an embodiment of the present invention. In this embodiment, the STA transmits both the QoS Null frame and vendor action frame to the AP when the transmission budget is about to be exhausted, whereas in some other embodiments, the STA may only transmit either the QoS Null frame or vendor action frame to notify its peer device the transmission budget is going to be exhausted. In step S402, the transmission budget of the STA is checked, and it goes to step S404 if the transmission budget is currently marked as being exhausted. The STA determines if there has been enough time passed such that the STA has transmission budget again in compliance with the duty cycle constraint in step S404, and the STA un-pauses traffic queues in step S406 when the STA has gained more transmission budget. The transmission budget may be calculated according to an accumulated airtime used by the STA for transmission within an observation window. For example, a STA is compliance with a 10% duty cycle constraint in any 60 minutes observation window, the transmission budget is 6 minutes if the STA has not transmitted any frame in the past 60 minutes. The transmission budget is 1 minute if the STA used an accumulated airtime of 5 minutes for transmission in the past 60 minutes. The STA enters a power management mode in step S412 when the STA still has not gained enough transmission budget, for example, as time moves forward, the transmission budget calculated according to the accumulated airtime within the most recent observation window is still below a safety threshold. In step S408, the STA determines if there is data traffic buffered in the AP, for example, based on one or more DTIM beacon frames received from the AP. In step S410, the STA transmits a QoS Null [awake] frame to notify the AP it is ready to receive and respond if there is data traffic buffered for the STA, otherwise, the STA enters a power management mode in step S412 when there is no data traffic buffered in the AP. The STA receives the buffered traffic from the AP in step S422 after sending the QoS Null [awake] frame in step S410. In this embodiment, the STA transmits the QoS Null [awake] frame to notify the AP it can receive and respond frames only when the AP has buffered data traffic, in some other embodiments, the STA transmits the QOS Null [awake] frame to notify the AP when it gains more transmission budget regardless there is data traffic buffered in the AP.

In step S414 of FIG. 4, the STA determines whether the transmission budget is about to be exhausted if the transmission budget is not yet marked as being exhausted in step S402. An example of determining whether the transmission budget is about to be exhausted includes comparing the transmission budget with a predefined threshold, where the predefined threshold is set to be longer than the airtime required to transmit both a QoS Null [asleep] frame and a vendor action frame in this embodiment. In some other embodiments, if only the QoS Null [asleep] frame or the vendor action frame is used to notify the AP, the predefined threshold may be set to be longer than to the airtime required to transmit a QoS Null [asleep] frame or a vendor action frame respectively. The STA may go to step S412 or it may stay awake if the transmission budget is not about to be exhausted. The STA transmits a QoS Null [asleep] frame in step S416 to notify the AP if the STA transmission budget is about to be exhausted. After transmitting the QoS Null [asleep] frame, the STA calculates a point of time in terms of TSF at which the STA will have the transmission budget to transmit frames again in step S418. The STA then inserts this TSF information into a vendor action frame and transmits it to the AP in step S418. In some other embodiments, the STA may calculate the point of time and send the vendor action frame first before sending the QoS Null [asleep] frame. In step S420, the STA marks the transmission budget has been exhausted and pauses the traffic queues, then enters the power management mode in step S412. The transmission budget is marked as being exhausted when the transmission budget is below the predefined threshold and the STA transmits both the QoS Null [asleep] frame and the vendor action frame according to this embodiment. The predefined threshold may be the same as or different from the safety threshold used to check if the transmission budget is enough for un-pausing the traffic queues depending on the application use or design.

Figure 5:
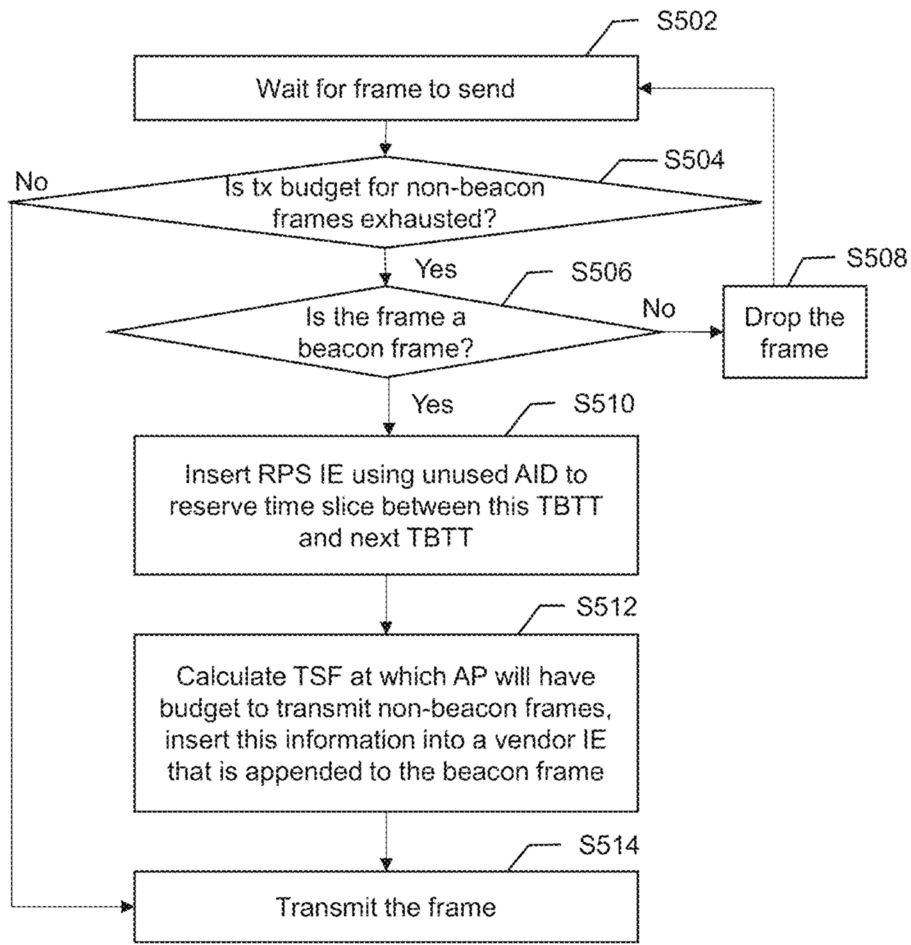
FIG. 5 is a flowchart illustrating an AP notifying an associated AP about transmission budget exhaustion in accordance with an embodiment of the present invention.

FIG. 5 is a flowchart demonstrating how an AP achieves the behavior of notifying associated STAs about transmission budget exhaustion in accordance with an embodiment of the present invention. In this embodiment, the AP notifies the STAs using both standard and proprietary signaling methods when the transmission budget for non-beacon frames is exhausted. In some embodiments, the AP only employs the standard signal method. In some other embodiments, the AP only employs the proprietary signal method as all the associated STAs are configured to be able to compute a resume time from the vendor IE carried in the beacon frame, where the resume time is when the AP will have budget for transmitting non-beacon frames. In step S502 of FIG. 5, the AP waits for a frame to be sent; when there is a frame to be sent, the AP determines whether a transmission budget for non-beacon frames has been exhausted in step S504. For example, the transmission budget for non-beacon frames is exhausted when the transmission budget is lower than a threshold reserved for beacon transmission. In cases when the transmission budget is sufficient for non-beacon frames, the AP transmits the frame in step S514. Otherwise, the AP determines whether this frame is a beacon frame in step S506 when the transmission budget for non-beacon frames is exhausted in step S504. In this embodiment, the AP drops the frame in step S508 when this frame is not a beacon frame. In cases when the AP is sending a beacon frame, the AP inserts a RPS IE with an unused Association ID (AID) to reserve a time slice between this Target Beacon Transmission Time (TBTT) and a next TBTT in step S510. In this embodiment, the AP further calculates a resume time in terms of TSF at which the AP will have transmission budget for non-beacon frames and inserts this information into a vendor IE that is appended to the to-be-sent beacon frame in step S512. The STAs capable of decoding this vendor IE will have the knowledge of when the AP will have transmission budget, whereas the STAs not capable of decoding this vendor IE will just wait to receive a next beacon frame at the next TBTT. In some other embodiments, the AP skips this step S512 of calculating the STF and inserting resume time information into the vendor IE, so all the STAs need to listen to the next beacon frame after receiving this incoming beacon. The order of these two steps S510 and S512 is switchable, or these two steps may be performed concurrently. The AP transmits the frame in step S514 and may go back to step S502 to wait for another frame to be sent.

Figure 6:
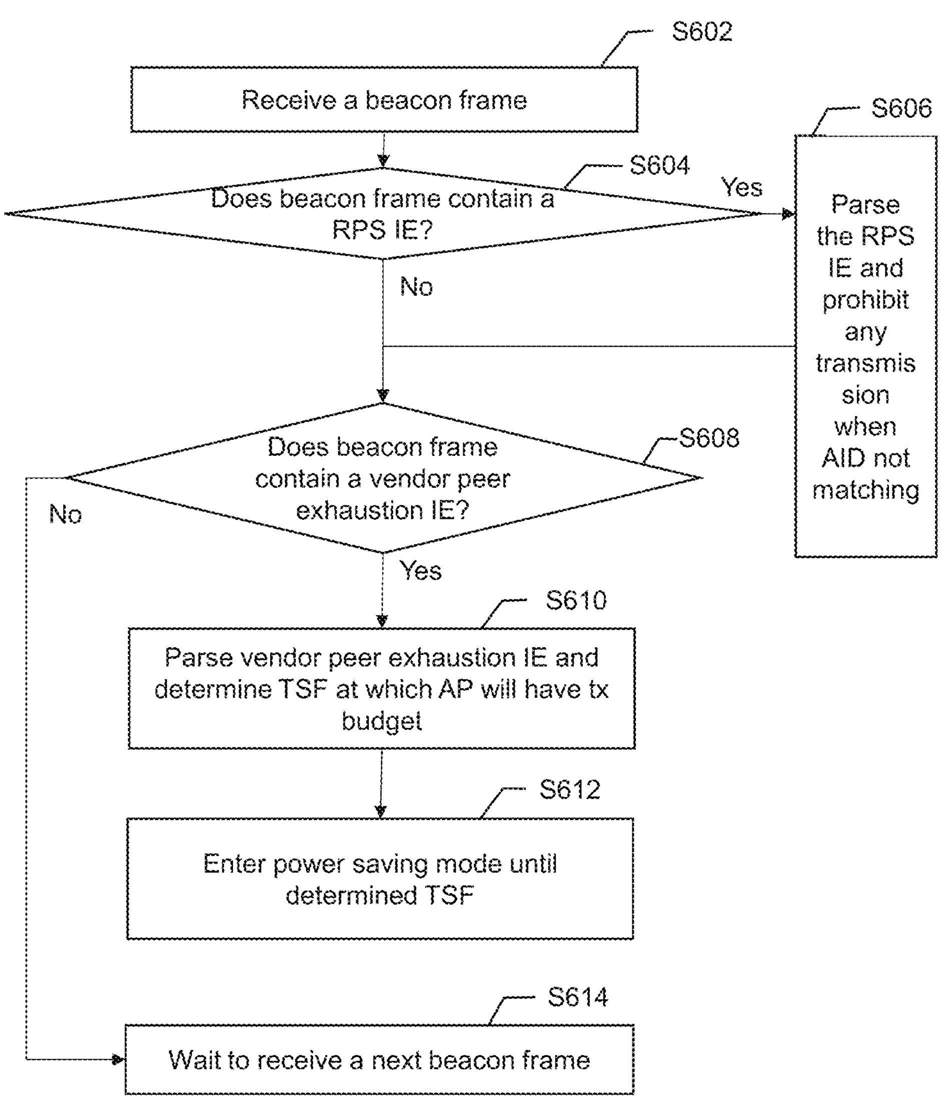
FIG. 6 is a flowchart illustrating a STA receiving signaling from an associated AP indicating it has exhausted its transmission budget in accordance with an embodiment of the present invention.

FIG. 6 is a flowchart illustrating a STA receiving notification from an associated AP indicating it has exhausted its transmission budget in accordance with an embodiment of the present invention. In this embodiment, the STA is capable of decoding a vendor peer exhaustion IE in beacon frames indicating when the AP has transmission budget again. The STA receives a beacon frame in step S602 and determines whether this beacon frame contains an RPS IE in step S604, if the beacon frame has a RPS IE, the STA parses the RPS IE in step S606. By parsing the RPS IE, if the AID in the RPS IE does not match the AID of the STA, indicating that the medium is reserved for a period of time, and the STA is prohibited to transmit any frame in this RAW defined by the RPS IE. The STA further determines whether a vendor peer exhaustion IE is contained in the received beacon frame in step S608. The STA waits to receive a next beacon frame in step S614 if the beacon frame does not contain a vendor peer exhaustion IE in step S608. In an example, the STA enters a power management mode before receiving the next beacon frame. In step S610, the STA decodes the vendor peer exhaustion IE and determines the TSF at which the AP will have transmission budget, and the STA may enter a power management mode until the determined TSF in step S612. In this embodiment, the STA may skip receiving one or more subsequent beacon frames if these beacon frames are transmitted before the determined TSF. In another embodiment where the STA is not capable of decoding a vendor peer exhaustion IE, after parsing the RPS IE with an AID not matching, the STA stops transmitting for the entire scheduled RAW and waits to receive a next beacon frame. The STA may enter a power management mode in between the two beacon frames.

Figure 7:
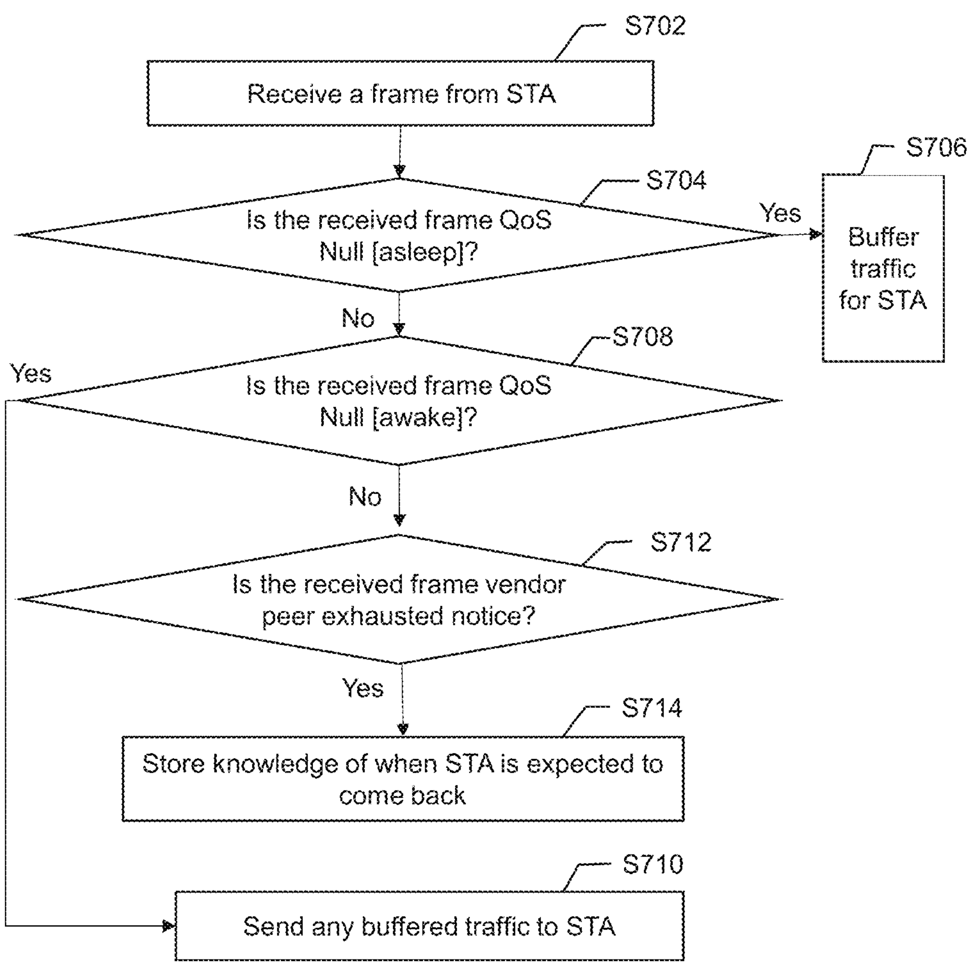
FIG. 7 is a flowchart illustrating an AP receiving signaling from a STA indicating it has exhausted its transmission budget in accordance with an embodiment of the present invention.

FIG. 7 is a flowchart demonstrating an AP receiving notification from an associated STA indicating it has exhausted its transmission budget in accordance with an embodiment of the present invention. In this embodiment, the AP is capable of decoding a vendor peer exhaustion notice indicating when the STA has transmission budget again. For example, the vendor peer exhaustion notice is conveyed through a vendor action frame, and the vendor peer exhaustion notice also includes information of a resume time in terms of TSF. The AP receives a frame from an STA in step S702 and determines whether this received frame is a QoS Null [asleep] frame in step S704. The AP buffers data traffic for this STA in step S706 after receiving a QoS Null [asleep] frame from the STA as it assumes the STA is in a power management mode. The AP determines whether the received frame is a QoS Null [awake] frame in step S708, and sends any buffered data traffic to this STA in step S710 when receiving a QoS Null [awake] frame from the STA. The AP checks if the frame received from the STA is a frame containing a vendor peer exhausted notice in step S712, and if so, the AP stores knowledge of when the STA is expected to gain more transmission budget according to the vendor peer exhaustion notice in step S714. FIG. 7 illustrates how the AP reacts when receiving these three types of frames related to transmission budget exhaustion notification; and descriptions of processing and reacting to other types of frames received by the AP have been omitted for brevity. In another embodiment, an AP not supporting proprietary signaling only responds to the data frames carrying the power management bit to pause or resume the communication with the STA.

Figure 8A:
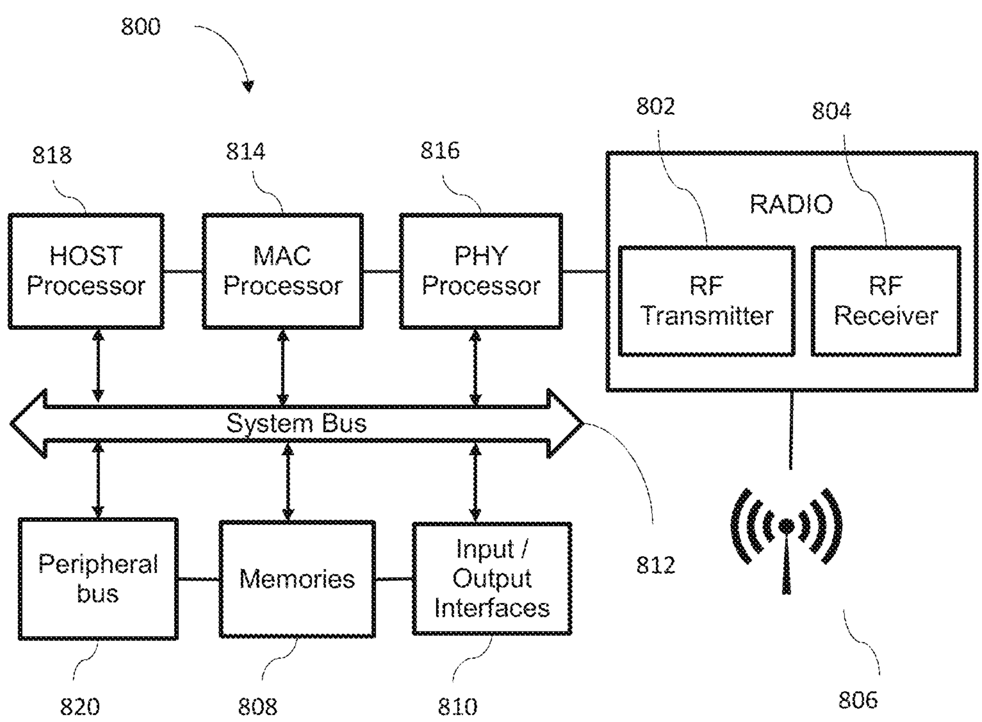
FIG. 8A illustrates a schematic block diagram of a wireless communication device for implementing an embodiment of the present invention.

FIG. 8A shows a high-level block diagram of a wireless communication device 800 that can be used to implement embodiments of the present invention. Embodiments of the wireless communication device 800 manage a Media Access Control (MAC) layer and a Physical (PHY) layer in compliance with an IEEE 802.11 standard having a duty cycle constraint. The wireless communication device 800 can be a Station (STA) or an Access Point (AP) of a wireless network. For example, the wireless communication device 800 can be implemented in a mobile device, a personal computer, a laptop computer, an Internet of Things (IoT) device, a wearable device, an extended reality device, a video server, a camera, or a communication device on a vehicle. The wireless communication device 800 includes a Radio Frequency (RF) transmitter module 802, an RF receiver module 804, an antenna unit 806, one or more memory banks 808, input and output interfaces 810 and communication bus 812. The RF transmitter module 802 and the RF receiver module 804 are also known as a modem (modulator-demodulator), which transmits frames by modulating one or more carrier wave signals to encoded digital information, as well as receives frames by demodulating the signal to recreate the original digital information. Furthermore, the wireless communication device 800 includes a MAC processor 814, a PHY processor 816, and a HOST processor 818. These processors can be any type of Integrated Circuit (IC) including a General Processing Unit (GPU), an Application Specific Integrated Circuit (ASIC) or Reduced Instruction Set Computer-Five (RISC-V) based ICs, amongst others. Memories 808 store software for the processors of the wireless communication device 800. Each processor executes software to implement the functions of the respective communication/application layer. The PHY processor 816, in particular, includes a transmitting signal processing unit and a receiving signal processing unit and manages the interface with the Wireless Medium (WM). The PHY processor 816 operates on Physical Protocol Data Units (PPDUs) by exchanging digital samples with the radio module which comprises the RF transmitter 802, Digital-to-Analog Converters (DACs), the RF receiver 804, Analog-to-Digital Converters (ADCs) and digital filters. The MAC processor 814 executes MAC level instructions and manages the interface between the application software and the WM, through the PHY processor 816. The MAC processor 814 is responsible for coordinating access to the WM so that the AP and STAs in range can communicate effectively. The MAC processor 814 adds header and tail bytes to units of data provided by the higher levels and sends them to the PHY layer for transmission. The reverse happens when receiving data from the PHY layer. If a wireless frame is received in error, the MAC processor 814 manages the retransmission of the wireless frame. The HOST processor 818 interfaces with the MAC layer and is responsible for running high level functionalities of the wireless communication device 800.

The peripheral bus 820 connects to a number of peripherals that support core functions of the wireless communication device 800, including timers, interrupts, radio/filters/system registers, counters, Universal Asynchronous Receiver-Transmitter (UART) and General Purpose Input Output (GPIO) interfaces and others. The PHY processor 816, the MAC processor 814, the HOST processor 818, the peripheral bus 820, memory 808 and input/output interfaces 810, communicate with each other via the system bus 812. Memories 808 may further store an operating system and applications. In some embodiments, memories 808 may store recorded information about captured frames and packets. The input/output interface unit 810 allows for the exchange of information with a user. The antenna unit 806 may include a single antenna or multiple antennas.

Figure 8B:
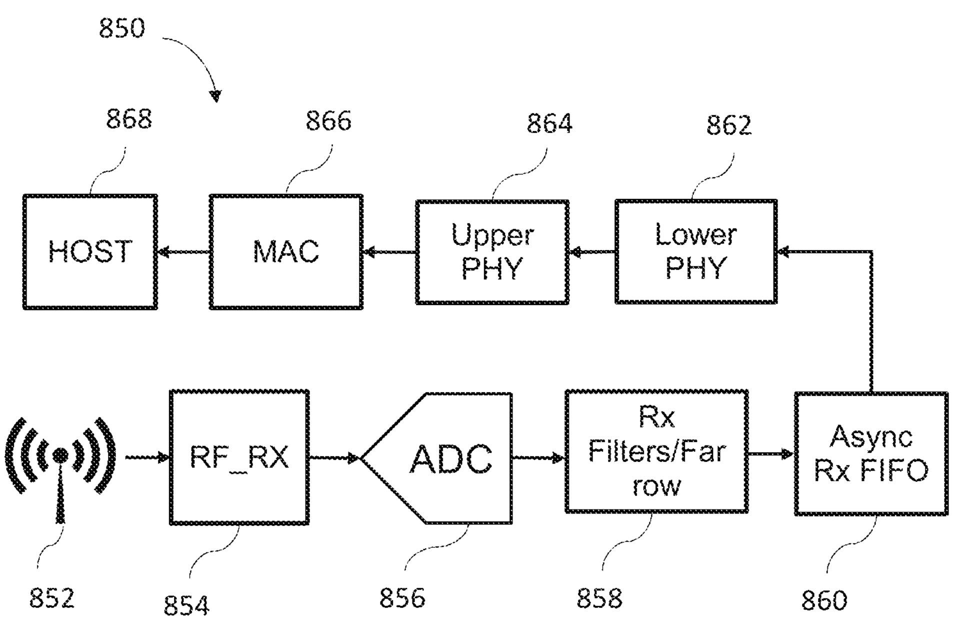
FIG. 8B illustrates a schematic block diagram of a receiver data flow architecture in a wireless communication device implementing an embodiment of the present invention.

FIG. 8B illustrates a simplified schematic block diagram of a receiver data flow architecture 850 used for receiving radio signals transmitted to the wireless communication device 800. Radio signals are received over the WM and transformed into electrical signals by a receiving antenna 852. The received signal is conditioned using a series of analog RF receiving (Rx) filters 854 before being converted into a digital signal using an ADC 856. The digital signal output from the ADC 856 is conditioned again using a digital filter bank 258, which can include one or more digital RF filters and/or a farrow filter, before samples in the digital signal are collected in an asynchronous receiving First-In-First-Out (FIFO) data structure 860. Samples in the asynchronous receiving FIFO data structure 860 can be accessed by a packet detect module and a sub-band module, both modules may be included in a lower-level PHY portion 862. In some embodiments, the lower-level PHY portion 862 together with an upper-level PHY portion 264 are included in the PHY processor 816 illustrated in FIG. 8A. The packet detect module included in the lower-level PHY portion 862 has hardware and/or implement algorithms that can be used to analyze the initial sections of a PHY Protocol Data Unit (PPDU) in the time domain. Based on the analysis, the packet detect module recognizes a received 802.11 frame and synchronizes frequency and timing of the wireless communication device with the packet being received. The sub-band module has hardware and/or implementing algorithms that can be used to detect which subchannel in the allocated frequency band is being used for transmitting the packet being received. Once a packet is detected and a relevant subchannel is established, samples are forwarded to an upper-level PHY portion 864. Some embodiments of the upper-level PHY portion 864 process and decode Orthogonal Frequency Division Multiplexing (OFDM) symbols to reconstruct the full PPDU. The reconstructed PPDU is subsequently processed by the MAC module 866 for extracting the data payload and providing relevant information to the HOST module 868 for consumption.

Figure 8C:
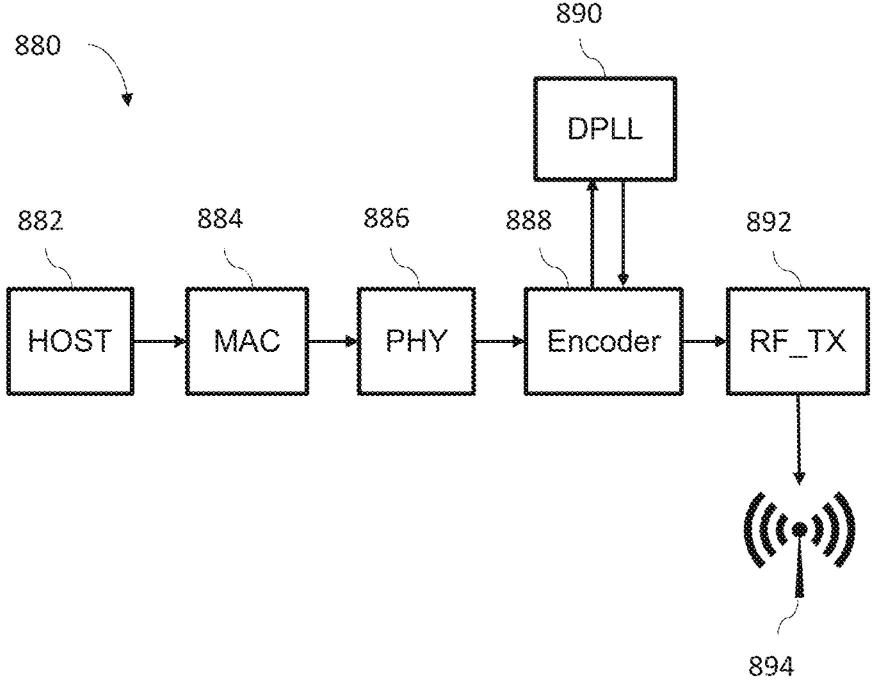
FIG. 8C illustrates a schematic block diagram of a transmitter data flow architecture in a wireless communication device implementing an embodiment of the present invention.

FIG. 8C illustrates a simplified schematic block diagram of a transmitter data flow architecture 880 used for transmitting radio signals over the WM. Data is generated from the HOST module 882 and packaged in a MAC level Protocol Data Unit (MPDU) to be routed over the wireless network by the MAC management module 884. The PHY module 886 interfaces with the WM and compiles a PHY level Protocol Data Unit (PPDU) by adding a PHY preamble and the tail to the MPDU. Usually a Modulation Coding Scheme (MCS) for transmission of the packet over the medium is established using a rate control algorithm by the MAC module 884 or the PHY module 886. The modulation scheme selected defines the modulation technique to be used to transmit the data on the WM and the coding rate. Based on the modulation scheme selected, for example Quadrature Amplitude Modulation (QAM) 64, the PPDU is modulated to be transmitted on the WM. The encoder module 888 generates signals corresponding to points of a QAM constellation symbols (groups of bits of the PPDU) which can be encoded using polar (r-θ) or cartesian (Q-I) coordinates. The modulation is done by linking the encoder module 888 to a Digital Phase Lock Loop (DPLL) 890. The modulated signals are filtered by analog filters 892 and transmitted using a transmitting antenna 894.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A signaling method for notifying a peer device wirelessly connecting to a wireless communication network, the signaling method comprising the steps of:

determining whether a transmission budget is about to be exhausted, wherein the transmission budget is derived based on a duty cycle constraint and an accumulated transmission time within an observation window;

in response to determining the transmission budget is about to be exhausted, transmitting a first data frame carrying a power management bit to the peer device and marking the transmission budget as being exhausted; and updating the transmission budget over time and transmitting a second data frame carrying a power management bit to the peer device to resume communication with the peer device according to the updated transmission budget.

2. The method of claim 1, wherein the first data frame carrying a power management bit is used to notify the peer device about entering a power management mode, and the second data frame carrying a power management bit is used to notify the peer device about leaving the power management mode.

3. The method of claim 2, wherein the first data frame carrying a power management bit is a Quality of Service (QOS) Null [asleep] frame and the second data frame carrying a power management bit is a QoS Null [awake] frame.

4. The method of claim 1, wherein the transmission budget is about to be exhausted when the transmission budget is below a threshold, and the threshold is set according to airtime for transmission of one or more frames.

5. The method of claim 4, wherein the threshold is set to be longer than airtime for transmitting the first data frame carrying a power management bit.

6. The method of claim 1, further comprising determining whether there is data traffic buffered in the peer device, and transmitting the second data frame carrying the power management bit only when there is buffered data traffic in the peer device.

7. The method of claim 6, further comprising receiving one or more beacon frames from the peer device and determining whether there is data traffic buffered in the peer device according to the one or more beacon frames.

8. The method of claim 1, further comprising entering a power management mode when the transmission budget is marked as being exhausted.

9. The method of claim 1, further comprising calculating a point of time at which the transmission budget will be updated to resume the communication with the peer device, inserting information corresponding to the point of time into a third frame, and transmitting the third frame to the peer device.

10. The method of claim 9, wherein the third frame is a vendor-specific action frame, and the point of time is calculated in terms of Time Synchronization Function (TSF).

11. The method of claim 9, wherein transmission budget is about to be exhausted when the transmission budget is below a threshold, and the threshold is set to be longer than airtime for transmitting the first data frame carrying a power management bit and the third frame.

12. The method of claim 1, further comprising:
receiving a beacon frame from the peer device;
parsing a vendor peer exhaustion Information Element (IE) in the beacon frame;
determining a resume time from the vendor peer exhaustion IE; and
entering a power management mode until the resume time.

13. A signaling method for notifying one or more peer devices wirelessly connected to a wireless communication network, the signaling method comprising the steps of:
determining whether a transmission budget is about to be exhausted, wherein the transmission budget is derived based on a duty cycle constraint and an accumulated transmission time within an observation window;
in response to the transmission budget is about to be exhausted, inserting a Restricted access window Parameter Set (RPS) Information Element (IE) into a beacon frame to reserve a time slice between a current Target Beacon Transmission Time (TBTT) and a next TBTT; and
transmitting the beacon frame on a wireless channel to notify the one or more peer devices transmission on the wireless channel between the current TBTT and the next TBTT is prohibited.

14. The method of claim 13, further comprising dropping any non-beacon frame in response to the transmission budget is about to be exhausted.

15. The method of claim 13, wherein the RPS IE in the beacon frame contains an unused Association ID (AID) that is not assigned to any peer device in the wireless communication network, and the peer devices receiving the beacon frame are prohibited to access the wireless channel between the current TBTT and the next TBTT.

16. The method of claim 13, wherein the transmission budget is about to be exhausted when the transmission budget is below a threshold, and the threshold is set to be longer than airtime for transmitting one or more beacon frames.

17. The method of claim 16, further comprising determining whether the transmission budget is still below the threshold at the next TBTT, in response to the transmission budget is still below the threshold at the next TBTT, inserting a RPS IE into a next beacon frame to reserve another time slice and transmitting the next beacon frame to the one or more peer devices.

18. The method of claim 16, further comprising calculating a point of time at which the transmission budget is above the threshold, and inserting information corresponding to the point of time into a vendor IE that is appended to the beacon frame.

19. The method of claim 13, further comprising:
receiving and parsing a vendor action frame from a first peer device notifying peer transmission budget exhaustion;
in response to receiving the vendor action frame, buffering data traffic for the first peer device and pausing communication with the first peer device; and
transmitting any buffered data traffic to the first peer device after a point of time derived from the vendor action frame.

20. A wireless communication device wirelessly connected to a wireless communication network, comprising:
a receiver and a transmitter;
a processor, communicatively coupled with the receiver and transmitter; and
one or more memory banks, communicatively coupled to the processor and storing processor readable codes that, when executed by the processor in conjunction with the receiver and transmitter, is configured for:
determining whether a transmission budget is about to be exhausted, wherein the transmission budget is derived based on a duty cycle constraint and an accumulated transmission time within an observation window;
in response to determining the transmission budget is about to be exhausted, transmitting a first data frame carrying a power management bit to the peer device and marking the transmission budget as being exhausted; and
updating the transmission budget over time and transmitting a second data frame carrying a power management bit to the peer device to resume communication with the peer device according to the updated transmission budget.

* * * * *